(12) United States Patent
Koodli et al.

(10) Patent No.: US 8,943,000 B2
(45) Date of Patent: Jan. 27, 2015

(54) CONNECTIVITY SYSTEM FOR MULTI-TENANT ACCESS NETWORKS

(75) Inventors: Rajeev Koodli, Sunnyvale, CA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 13/354,762

(22) Filed: Jan. 20, 2012

(65) Prior Publication Data

US 2013/0191257 A1 Jul. 25, 2013

(51) Int. Cl.
*G07F 19/00* (2006.01)

(52) U.S. Cl.
USPC .......................................................... 705/34

(58) Field of Classification Search
None
See application file for complete search history.

(56) References Cited

U.S. PATENT DOCUMENTS

| | | | | |
|---|---|---|---|---|
| 7,391,748 | B2 * | 6/2008 | Feather | 370/328 |
| 7,447,765 | B2 * | 11/2008 | Aerrabotu et al. | 709/224 |
| 2003/0055933 | A1 | 3/2003 | Ishizaki et al. | |
| 2006/0245439 | A1 | 11/2006 | Sajassi | |
| 2009/0092137 | A1 * | 4/2009 | Haigh et al. | 370/392 |

FOREIGN PATENT DOCUMENTS

WO  WO 201217512 A1 * 12/2012

OTHER PUBLICATIONS

"Cisco Integrated Services Routers Generation 2—Transforming the Next Generation Branch Office Experience—Any Service, Any Branch, Anywhere," pp. 1-2 © 2010 Cisco and/or its affiliaties; Available at least as early as Sep. 22, 2010.
International Search Report, dated Mar. 26, 2013, in International Application No. PCT/US2013/021572, pp. 1-11, European Patent Office, The Netherlands.

* cited by examiner

*Primary Examiner* — Paul Danneman
(74) *Attorney, Agent, or Firm* — Brinks Gilson & Lione (57) ABSTRACT

A system may provide connectivity service in a multi-tenant network. A first node in the multi-tenant network can receive data packets, each of the data packets identifying one of a plurality of tenant devices. The first node can determine an Internet Protocol (IP) address associated with each of the data packets. The first node can determine a Virtual Local Area Network Identifier (VLAN ID) based on the IP address, the VLAN ID being a unique identifier of a respective one of the tenants. The first node can add the VLAN ID of a corresponding one of the tenants into a header of each of the data packets. The first node can transport the data packets to a second node in the multi-tenant network via a multi-tenant network tunnel protocol.

20 Claims, 4 Drawing Sheets

CONNECTIVITY SYSTEM FOR MULTI-TENANT ACCESS NETWORKS

TECHNICAL FIELD

This disclosure relates generally to networks, and more particularly to multi-tenant networks.

BACKGROUND

Demand for high speed Internet access and advanced communications services has dramatically increased over the last couple of years. A device enabled with Wi-Fi, such as a personal computer, video game console, smartphone, tablet, or digital audio player, can connect to the Internet via a wireless network access point. In recent years, wireless networks have been widely implemented in many airports, hotels, stadiums, fast-food restaurants, and other facilities across the country.

DESCRIPTION OF EXAMPLE EMBODIMENTS

OVERVIEW

By way of introduction, the example embodiments described below include a system and a method to create a virtual context for each tenant in a multi-tenant environment. The system and method may be used for sharing a connectivity service and for individual policy applications based on signaling messages.

According to a first aspect, a system may provide connectivity service in a multi-tenant network. The system can include a first node and a second node, the second node in communication with the first node over the multi-tenant network. The first node can receive a plurality of data packets, each of the data packets identifying one of a plurality of tenant devices. Each of the tenant devices is associated with a tenant. The first node can determine an Internet Protocol (IP) address associated with each of the data packets. The first node can determine a Virtual Local Area Network Identifier (VLAN ID) based on the IP address, the VLAN ID being a unique identifier of a respective one of the tenants. The first node can add the VLAN ID of a corresponding one of the tenants into a header of each of the data packets. The first node can transport the data packets to the second node via a multi-tenant network tunnel protocol.

In a second aspect, a method may provide forwarding data packets in a multi-tenant network. The method can include receiving with a first node data packets associated with a plurality of tenant devices. Each tenant device is associated with a tenant. The method can include determining with the first node an Internet Protocol (IP) address associated with each of the data packets. The method can include determining with the first node a tenant identifier based on the IP address, the tenant identifier being a unique identifier of a respective one of the tenants. The method can include adding with the first node the tenant identifier corresponding to one of the tenants into a header of each of the data packets. The method can include transporting the data packets between the first node and a second node via a multi-tenant network tunnel protocol.

In a third aspect, a tangible computer-readable media comprises a plurality of instructions for execution with a processor. The computer readable medium can include instructions executable to receive data packets from a tenant device associated with one of a plurality of tenants. The tangible computer-readable medium can include instructions executable to identify a tenant from among the plurality of tenants based on the received data packets. The tangible computer-readable medium can include instructions executable to insert an identifier uniquely associated with the tenant in a header of the data packets. The tangible computer-readable medium can include instructions executable to transport the data packets from a customer premises equipment (CPE) device to a mobile gateway via a multi-tenant network tunnel protocol, wherein the data packets includes the identifier associated with the tenant. The tangible computer-readable medium can include instructions executable to instructions executable to determine a policy profile of the tenant based on the identifier. The tangible computer-readable medium can include instructions executable to apply policy rules to the data packets based on the policy profile.

Further aspects and advantages are discussed below in conjunction with the example embodiments.

Example Embodiments

Figure 1:
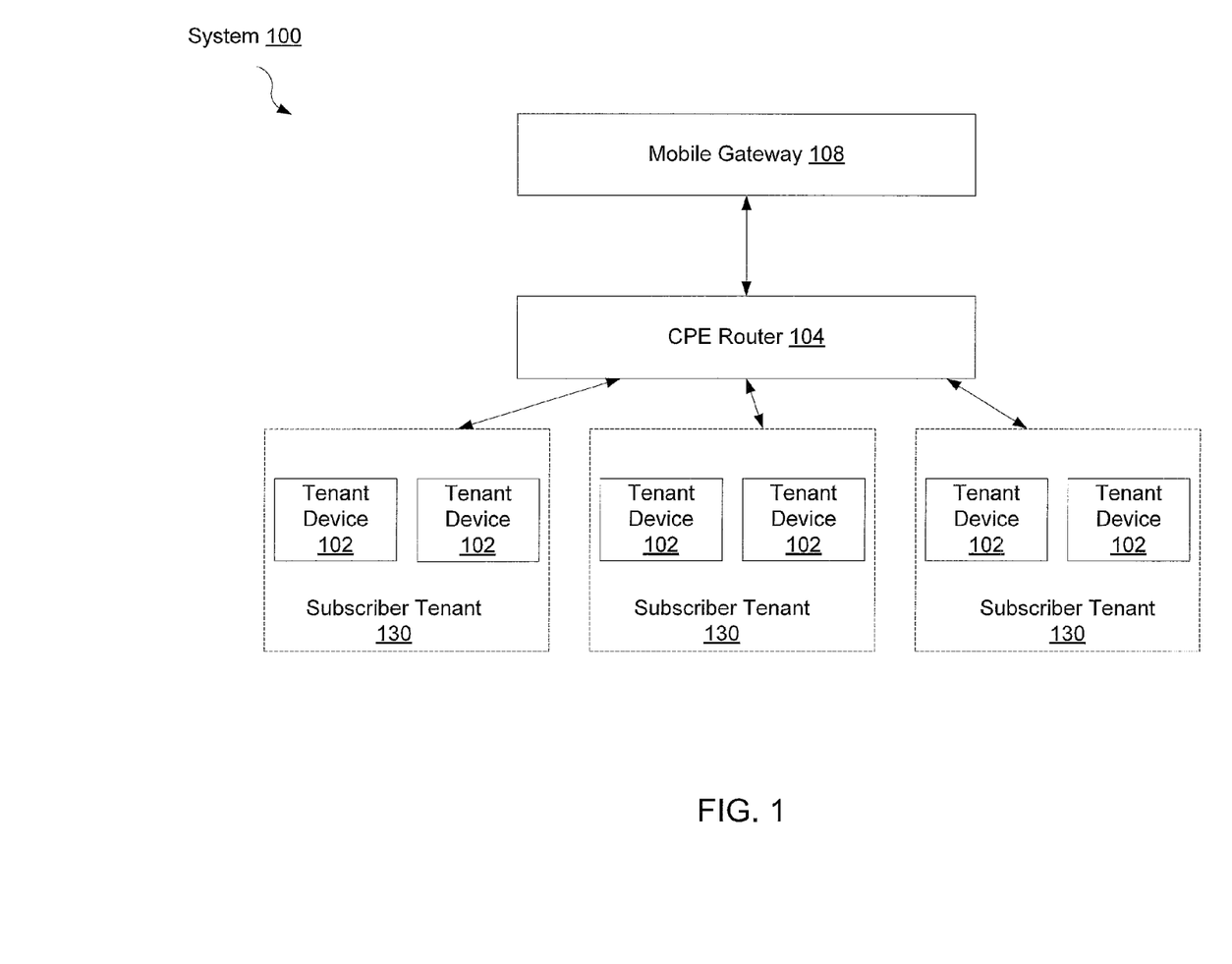
FIG. 1 illustrates an example of components in a multi-tenant access network system.

FIG. 1 is one example of a multi-tenant access network system 100 components. In one example, the multi-tenant access network system 100 can be a wide area network (WAN). The multi-tenant access network system 100 may include tenants 130. A tenant 130 may be any network or combination of networks of tenant devices 102 that communicate with one another. For example, a tenant can be a LAN (local area network). A tenant 130 may further include any device that enables communication among the tenant devices 102, such as a Wi-Fi Access Point. In the example of FIG. 1, each of the tenants 130 may include any number of tenant devices 102. The multi-tenant access network system 100 may include a plurality of nodes used to communicate data packets within the multi-tenant access network system 100. For example, nodes in the multi-tenant access network system 100 can include a Customer-Premises Equipment (CPE) router 104 or a mobile gateway 108.

The tenant device 102 may be any type of computing device capable of establishing a networked connection and capable of providing display, user interface, and/or input capabilities. The tenant device 102 may be configured as, for example, a desktop computer, a personal computer (PC), a laptop computer, a palmtop computer, a handheld computer, a cellular telephone, a smart phone, a personal digital assistant (PDA), a computer workstation, a tablet PC, and the like.

The tenant device 102 may include a user interface, a processor, a memory, and/or an input/output (I/O) interface. Additionally, or alternatively, the user interface may include any form of audio and/or visual outputs for receipt by a user of the tenant device 102. The audio and/or visual outputs of the user interface may include, for example, a light emitting diode (LED), a meter, a display, such as a liquid crystal display (LCD), or any other mechanism providing indication to a user of the condition and/or operation of the tenant device 102.

The processor of the tenant device 102 may be used to run operating system applications, firmware applications, media playback applications, media editing applications, or any other application. In some embodiments, the processor can drive a display and process inputs received from one or more input devices.

The memory of the tenant device 102 may be a volatile and/or a nonvolatile memory device that is configured to store instructions executable by the processor. The memory may include a medium that preserves data for retrieval, such as instructions retrieved for execution. The memory may include a hard disk drive, a compact disc drive, a digital versatile disc drive, a Random Access Memory (RAM), a Read Only Memory (ROM), a Programmable Read-Only Memory (PROM), an Electrically Erasable Programmable Read-Only Memory (EEPROM), a flash memory, or any other data storage device.

The tenant device 102 may communicate with one or more input and/or output devices via the I/O interface. The input devices may include, for example, a keyboard (e.g., a hard keyboard or a soft keyboard), a mouse (e.g., a trackball, a rollerball, a touchpad, or other pointing device), a stylus or other pen-type input device (e.g., for a tablet PC type computing device), a disk drive, a USB port, a network connection, a joystick type controller, a telephone connection, an Ethernet connection, a voice recognition capability, or any other type of input device. The output device may include, for example, a fax machine, a printer, a copier, an image and/or video display device (e.g., a television, a monitor, or a projector), an audio output device, or any other type of output device.

Customer-premises equipment or customer-provided equipment (CPE) is any terminal and associated equipment located at a subscriber's premises and connected with a service provider's telecommunication channel(s). One type of CPE device is a router. A router is a device that forwards data packets between computer networks. A data packet may comprise a formatted unit of data. The data packet may consist of two kinds of data: control information and user data. The control information may provide the data that the network needs in order to deliver the user data (e.g., source and destination addresses). A CPE router 104 may be configured to function in multi-tenant scenarios, which may enable service to be shared across disparate tenants by providing a virtualized tenant context. In such multi-tenant deployments, data traffic treatment may be provided at the CPE router 104 based on individual policy requirements.

A mobile gateway 108 may be used in wireless communication networks to interconnect different networks. The mobile gateway 108 may provide the connection to a service provider IP-based network which enables connection over the Internet. The mobile gateway 108 may perform policy enforcements and charging support for each tenant 130. In one example, the mobile gateway 108 may comprise a Packet Data Network Gateway (PGW). In other examples, another type of mobile gateway may be used.

Figure 2:
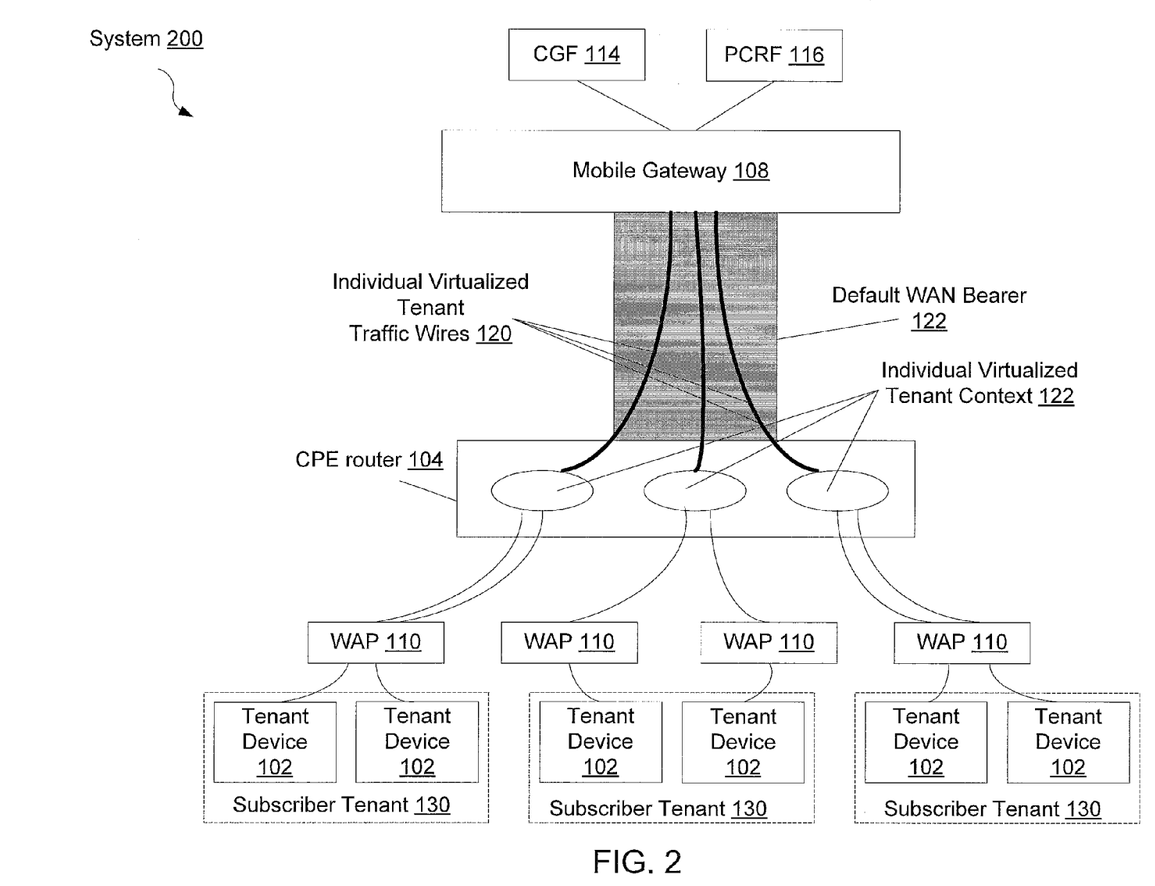
FIG. 2 illustrates an example of a multi-tenant access LTE network system.

FIG. 2 is a schematic view of an example multi-tenant access network system 200. The system 200 may include one or more tenant devices 102, a CPE router 104, a mobile gateway 108, and one or more Wi-Fi Access Points 110. The mobile gateway 108 may communicate with a charging gateway function (CGF) 114 and/or a policy charging rules function (PCRF) 116 to receive policy and/or charging information. The system may provide a virtualized tenant context 118 for each subscriber tenant 130 which may provide individual virtual tenant traffic pipes 120 along a shared default wide area network (WAN) bearer 122. A Wi-Fi Access Point 110 is a device that allows wireless devices to connect to a network using. Wi-Fi, BLUETOOTH or any other communication protocol. Each Wi-Fi Access Point 100 may communicate with the CPE router 104 to relay tenant data between the wireless devices (such as computers or smart phones) and the devices on the network.

Figure 3:
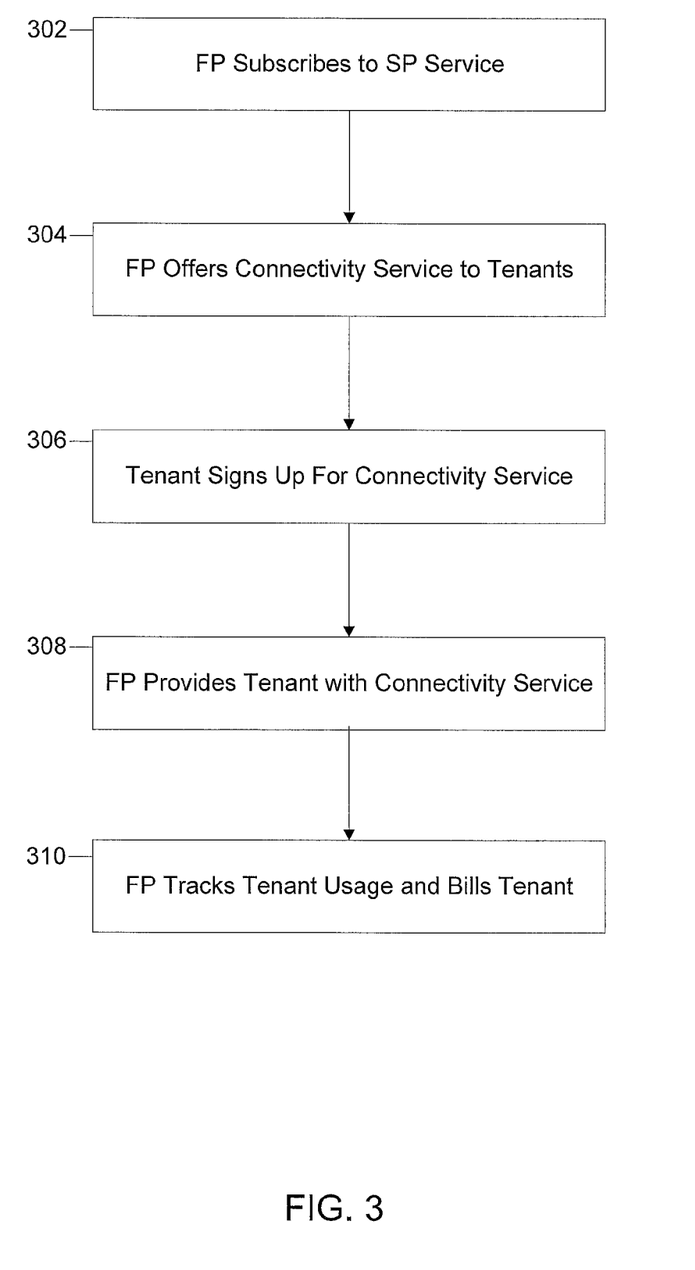
FIG. 3 illustrates an example process flow for providing a connectivity service to a facility provider in multi-tenant access network.

FIG. 3 illustrates an example process flow for providing the connectivity service to a facility provider (FP) in multi-tenant access network. The FP may subscribe to a connectivity service provided by a service provider (SP) at step 302. The FP may be included in a multi-tenant facility. For example, the facility may be a stadium, hospital, shopping mall, office building, or other facility having multiple tenants.

The SP may be any business entity which provides network connectivity services, including personal and business access to the Internet. The SP may provide the multi-tenant infrastructure required to deliver connectivity service through a wireless Local Area Network (LAN) or wireless broadband network. This, in turn, allows the FP to provide connectivity service throughout the facility to multiple tenants. In some examples, the FP may be a facility owner or a third party service provider. In other examples, the FP may be another entity.

To provide connectivity to the SP's network, the FP may install the CPE router 104. In one example, the CPE router may be owned by an entity other than the SP. In a second example, the CPE router 104 may be provided by the SP as part of the connectivity service to a set of co-located tenants.

Establishing basic Internet Protocol (IP) connectivity at the FP may include setting up wide area network (WAN) connectivity. To that end, a shared default WAN bearer 122 may be established. In a mobile network such as a Long Term Evolution (LTE) network, the default WAN bearer 122 may be a default Evolved Packet System (EPS) bearer. LTE is an example standard used in mobile networks. The default WAN bearer 122 may extend from the CPE router 104 to the mobile gateway 108. The mobile gateway 108 may provide the default WAN bearer 122 with the applicable policy for the FP. The applicable policy for the FP may include predefined attributes related to the connectivity service. For example, the attributes may include a guaranteed bitrate and maximum bitrate for traffic flows for the FP.

A tunnel may be established for data forwarding. The tunnel establishes a communication link between the CPE router 104 and the mobile gateway 108. In a LTE network environment, for example, a GTP (GPRS tunnel protocol) or Mobile Internet Protocol (Mobile IP) tunnel may be established to carry tenant data packets between the CPE router 104 and the mobile gateway 108. Mobile IP is a communications protocol that is designed to allow mobile users to move from one network to another while maintaining a permanent IP address. Mobile IP builds on the Internet Protocol by making mobility transparent to applications and higher level protocols. In an LTE network environment, the CPE router 104 may act as an LTE User Equipment (UE) in the WAN.

Every device that connects to the Internet has to have an Internet Protocol (IP) address assigned to it. IP addresses identify where the device is located on the Internet so that web servers and mail servers can send data to the correct device. The CPE router 104 may obtain a pool of IP addresses for later allocation to tenants subscribing to the connectivity service. In one example, the CPE router 104 may obtain a pool of IPv4 addresses. Alternatively or in addition, the CPE router 104 may run IPv6 prefix delegation and obtain a prefix chunk of address space for later allocation. An IPv6 prefix indicates the portion of the address used for routing or for identifying an address range. The growth of the Internet has created a need for more addresses than are possible with IPv4. IPv6 was developed by the Internet Engineering Task Force (IETF) to deal with IPv4 address exhaustion.

After connectivity has been established between the FP and the SP, the FP may offer separate, individually configurable, autonomous connectivity services to each of its tenants at step 304. A tenant may be any entity within the facility that wishes to avail themselves of the connectivity services provided by the FP. A tenant may include an organization, individual or other business entity which uses and/or rents space within the facility. For example, tenant examples within a sports stadium context may include a gift shop, pizza shop, and other retail establishments.

Each of the tenants may sign up for their own individual, discrete, independent, and autonomous connectivity service at step 306. Individual and separate traffic treatment at the CPE router 102 may then be provided based on the connectivity service selected by the respective subscriber tenant 130. In one example, a graphical user interface (GUI) may be provided for presenting information to and/or receiving information from subscriber tenants 130. For example, the GUI may allow each of the subscriber tenants 130 to independently and autonomously sign up for services and provided connectivity options. Generally, the GUI provides the particular subscriber tenant 130 with an efficient and user-friendly presentation of data provided by or communicated within the system 200 and/or also an efficient and user-friendly means for the user to self-manage their own settings and access services offered by the facility provider. The GUI may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI can include any graphical user interface, such as a generic web browser or touch screen that processes information and presents the results to the user.

Using the GUI, the subscriber tenant 130 may select connectivity attributes when subscribing to the connectivity service. For example, the attributes may include, but not limited to, one or more of the following: a guaranteed bitrate for tenant traffic flow, a maximum bitrate allowed for tenant traffic flow, an indication of whether traffic isolation (e.g., VLAN separation) is required, an indication of whether traffic encryption (e.g., Internet Protocol Security or "IPsec") is required, an indication of whether an on-demand bearer is necessary, an indication of whether on-demand bearer is necessary for special events (e.g., a company video broadcast) and charging tier. The attributes define the actual services a subscriber tenant 130 subscribes to with the FP.

The FP may independently provide each of the subscribed tenants with connectivity services at step 308. To that end, the CPE router 104 may perform several operations to create an autonomous virtual context for each of the tenants for sharing the WAN connectivity and for individual policy application based on signaling messages. The virtual tenant context exists within the realm of the connectivity service offered to the FP by the SP. In other words, the maximum bitrate of a subscriber tenant 130 may not exceed the maximum bitrate offered to the FP by the SP.

In order to virtualize the tenant's connectivity service, the CPE router 104 can bind the tenant's LAN connectivity to the WAN service which is offered on the mobile gateway 108. For example, basic LTE WAN connectivity is provided by the default WAN bearer 122 which is similar to a leased line. A leased line connects two locations for private voice and/or data telecommunication service. Not a dedicated cable, a leased line is actually a reserved circuit between two points. A leased line maintains a single open circuit at all times. Additional capacity on-demand can be provided by a dedicated bearer.

The input for a bind operation comes from a specific tenant's individualized subscription parameters. The CPE router 104 and the mobile gateway 108 both maintain an enumerated list of policy profiles. In one example, each policy profile may be unique to each tenant. In a second example, a particular subscriber tenant's subscription parameters may map to one of a standard set of policy profiles. In other examples, both types of policy profiles may be used. Each policy profile indexes into a connectivity service with its own policy and charging characteristics. For example, a profile may indicate a certain average traffic rate, secure data transport service, and the associated charging tier. The bind operation involves applying the policy and charging operations to the tenant's context based on the service agreement between the tenant and the FP. The CPE router 104 communicates signaling messages to the mobile gateway 108 in order to provide tenant connectivity with the desired subscription. The CPE router 104 communicates signaling messages to the mobile gateway 108 at the time of establishing the tenant context in order to provide tenant connectivity with the desired subscription. In addition, the CPE router 104 may communicate signaling messages to the mobile gateway 108 when changes are made to the tenant context (e.g., if a tenant changes its subscription).

Figure 4:
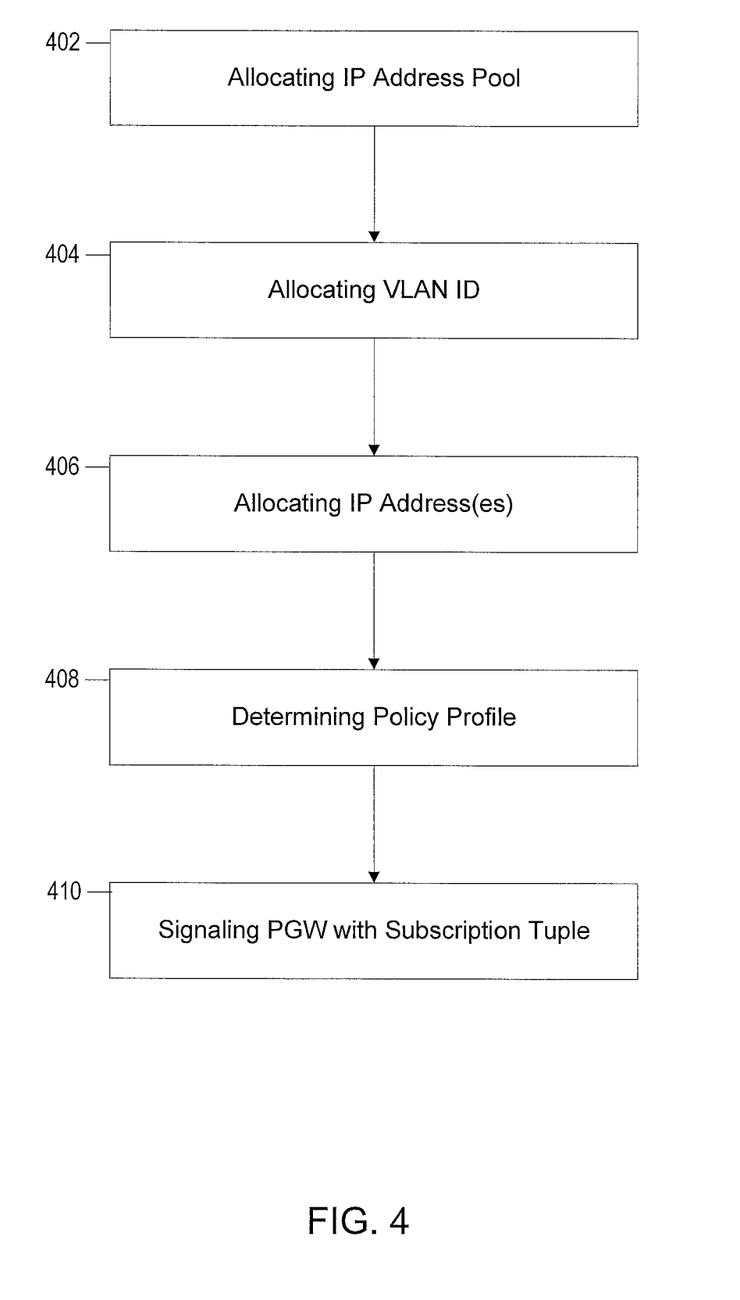
FIG. 4 illustrates an example of the operations performed by a CPE router based on the services provided to a tenant.

FIG. 4 illustrates the operations performed by the CPE router 104 to create a virtual context for each of the tenants sharing the WAN connectivity and for individual policy application to each respective tenant. The CPE router 104 may allocate an IP address pool for the subscriber tenant 130 at step 402. In one example, the CPE router 104 may allocate an IP address pool based on the local network address translator (NAT) realm. A NAT realm is a pool of unique IP addresses available for translation from private source IP addresses. NAT may be necessary when the number of IP addresses allocated to the subscriber tenant 130 is less than the total number of devices the subscriber tenant 130 wishes to use. A NAT translates the addresses of packets leaving a first routing realm to an address from a second routing realm, and performs the reverse function for packets entering the first routing realm from the second routing realm. This provides transparent routing for the traffic traversing between networks.

The CPE router 104 may allocate a virtual local area network identifier (VLAN ID) to the subscriber tenant 130 at step 404. The VLAN ID may be a unique identifier used to identify the tenant. VLAN tagging is the practice of inserting a VLAN ID into a packet header in order to identify which subscriber tenant 130 the packet data belongs to. The VLAN ID may be used to isolate individual tenant traffic by defining individual virtualized tenant traffic wires 120. VLAN tagging is a method for creating independent logical networks for each subscriber tenant 130 within the physical network. Referring back to FIG. 2, CPE router 104 may receive a plurality of packet data originating from multiple tenant devices 102. The allocated VLAN ID is inserted into the corresponding header of the packet data of each respective tenant 130, thereby creating an independent and separate logical network for each tenant 130.

The CPE router 104 may allocate IP addresses to the subscriber tenant 130 at step 406. For example, if the tenant 130 requests IPv6 services, the CPE router 104 may allocate an IPv6 prefix from the chunk received earlier.

The CPE router 104 may determine the policy profile based on the tenant subscription at step 408. The CPE router 104 may signal the mobile gateway 108 with the appropriate subscription tuple at step 410. The subscription tuple may hold the allocated IP addresses and the policy profile of the tenant. The policy profile of the subscriber tenant 130 may be maintained at the CPE router 104 and the mobile gateway 108. In an LTE environment, signaling the mobile gateway 108 may be done using the Protocol Configuration Option (PCO) parameters. The PCO is a parameter that the CPE router 104 can provide to the mobile gateway 108. In LTE, the signaling may be done using the "UE Requested Bearer Resource Modification" procedure. In one example, the mobile gateway 108 may interact with an external policy server for extracting the policy and charging rules corresponding to the supplied policy profile. In a second example, the mobile gateway 108 may consult its local policy service for extracting the policy and charging rules corresponding to the supplied policy profile. The successful operation establishes a context at both the CPE router 104 and the mobile gateway 108 for the tenant. Traffic treatment for each tenant is based on the separate and individual tenant context associated with the respective tenant.

At this point, the subscriber tenant 130 is successfully subscribed to the service based on the chosen subscription. In one example, an indication as such may be provided on the user interface used for subscribing to the service. The FP may use the above procedure for establishing a subscription for any new tenant.

A basic connectivity subscription may involve signaling the subscription tuple with an IP address of the tenant. The IP address may be the new IPv4 address(es) and/or IPv4 prefix chunk requested for the WAN link for the tenant. On the LAN side, private IPv4 addresses and delegated IPv6 prefixes are supported. For basic connectivity service, the mobile gateway 108 maintains the tenant context for the IP address(es) assigned to the subscriber tenant 130 and the corresponding tunnel (e.g., GTP tunnel). The mobile gateway 108 applies policy and charging rules to the corresponding tenant traffic according to this context.

The subscriber tenant 130 may request connectivity service that includes traffic isolation. For example, a traffic isolation indicator may be stored in the policy profile associated with the subscriber tenant 130. Co-locating diverse tenants in a virtualization environment can require a significant degree of resource isolation. A subscriber tenant 130 on one virtual machine should not be able to access CPU processes, stored data, or the network traffic of other tenants. A solution to the isolation problem may be to assign each organization a unique identifier, such as a VLAN ID. This insures that traffic belonging to each unique subscriber tenant 130 is sufficiently isolated.

Basic connectivity with traffic isolation may require signaling the subscription tuple. The subscription tuple may hold IP addresses and the policy profile. The CPE router 104 and the mobile gateway 108 may maintain VLAN separation for the subscriber tenant 130 by encapsulating the VLAN frames. VLAN tags carried in the GTP tunnel can identify the individual tenants. The VLAN ID allocated to the subscriber tenant 130 may be inserted into each tenant packet header to identify which subscriber tenant 130 the packet belongs to.

When a data packet is received (e.g., from a tenant device), the header and data can be used as the data field of a frame. The entire packet can be put in an envelope (i.e., the frame). The frames may be encapsulated within a data tunnel tunneling protocol, such as the LTE tunneling protocol called GTP. The direction of the traffic flow may determine which device performs the encapsulation and which device performs the decapsulation. For example, the CPE router 104 can encapsulate outgoing or upstream traffic while the mobile gateway 108 may perform decapsulation. The mobile gateway 108 can encapsulate incoming or downstream traffic while the CPE router 104 may perform decapsulation. For connectivity with traffic separation, the mobile gateway 108 may maintain a mapping of the VLAN ID to the policy profile for the tenant. Both the CPE router 104 and the mobile gateway 108 may establish a tunnel endpoint, such as a VLAN-over-GTP tunnel end-point. The CPE router 104 may tunnel the VLAN frame inside the shared GTP tunnel to the mobile gateway 108. The mobile gateway 108 may apply policy rules and NAT (if necessary) based on the VLAN tag and the indexed policy profile.

A particular subscriber tenant 130 using the CPE router 104 may wish to ensure the secure transmission of data. To that end, the tenant's subscription may include traffic encryption. For example, a traffic encryption indicator may be stored in the policy profile associated with the tenant. The CPE router 104 may initiate an appropriate security protocol using an allocated IP address of the subscriber tenant 130 to create a secure tunnel for the tenant's IP traffic. Once the secure tunnel is established, both the CPE router 104 and the mobile gateway 108 may update their tenant context to encapsulate the secure tunnel within the WAN (GTP) tunnel or inside the VLAN tunnel prior to GTP encapsulation.

For example, an Internet Key Exchange version 2 (IKEv2) protocol may be used to create the secure tunnel. In an LTE network, the result may be a secure (e.g., IPsec) tunnel inside the LTE WAN tunnel (GTP). One example embodiment uses Internet Protocol Security (IPSec), but the system architecture may, alternatively, use other security protocols, such as Point-to-Point Tunneling Protocol (PPTP).

Privacy, integrity, and authenticity of information transferred point-to-point across IP networks may be performed with a predetermined protocol. For example, the IPsec protocol, and related protocols such as IKE and ISAKMP (collectively referred to as IPsec), provides a standards-based method of providing privacy, integrity, and authenticity to information transferred point-to-point across IP networks, such as the public Internet and private local networks. IPsec provides IP network-layer encryption. That is, it provides security at the packet-processing layer of network communication.

IPsec defines formats of packet headers to be added to IP packets, including the authentication header (AH) to provide data integrity and the encapsulating security payload (ESP) to provide confidentiality and data integrity. Furthermore, key management and security associations are negotiated with the Internet Key Exchange (IKE). A security association (SA) is a set of IPsec parameters between two devices. Because the encrypted packets appear to be ordinary packets, they can easily be routed through any IP network without changes to the intermediate network equipment.

IPsec provides two modes of operation: transport mode and tunnel mode. In transport mode, only the IP payload is encrypted, with the original IP headers left intact. Transport mode adds minimal bytes to each packet. In tunnel mode, the entire original IP packet is encrypted and it becomes the payload in a new IP packet. This allows a network device, such as a router or gateway, to act as an IPsec proxy and perform encryption on behalf of the hosts. The source router or gateway encrypts packets and forwards them along the IPsec tunnel and the destination router or gateway decrypts the original packet and forwards it to the destination host. In other examples, any other protocol may be used.

On occasion, the subscriber tenant 130 may require additional bandwidth control to prioritize certain types of traffic. For example, highly interactive applications such as video or streaming media can require a higher priority than casual web browsing. To that end, a dedicated connectivity service may be requested by a subscriber tenant. A dedicated connectivity service may require signaling for a dedicated bearer. A dedicated connectivity service can be a permanent subscription option for a subscriber tenant 130 or an on-demand option for events such as company video broadcast. If the policy profile of a particular subscriber tenant 130 requires creation of a dedicated connectivity service, the mobile gateway 108 may initiate the appropriate procedure which may be executed by the "Create Bearer Request/Response" messages. This procedure creates a new end-end bearer between the CPE router 104 and the mobile gateway 108. The tenant context now maps to the dedicated bearer with the corresponding policy and charging rules. In addition, the dedicated bearer service may use traffic separation and/or traffic encryption service outlined above.

The dedicated bearer may be taken down based on duration. For example, the tenant 130 may need the dedicated bearer on one occasion for two hours for a conference. In another example, the dedicated bearer may be set up as a repeating event such as a weekly one-hour company meeting that is broadcast via the Internet to satellite offices.

The FP may individually and separately track tenant usage and bill the tenants at step 310. Customers are typically billed periodically for such services, such as with monthly billing. The mobile gateway 108 may track and bill for tenant usage of a network service in accordance with each of the tenant's subscription. Periodically, the mobile gateway 108 generates individualized tenant usage and billing records for each tenant, which can be shared with the FP and/or directly with the each of the individual tenants.

Service usage can be tracked in several ways. Service usage can be tracked via the mobile gateway 108. In some implementations, the usage information can be stored in an appropriate field in the mobile gateway 108, or in some implementations, the usage information can be provided by the mobile gateway 108 for storage on an associated data store. There can be some implementations where both of these operations can be done to track service usage. Accordingly, the mobile gateway 108 can track usage by, in some implementations, updating usage data in the mobile gateway 108, or in some implementations, by updating usage data in a data store associated with the mobile gateway 108. In some implementations, both operations can be done.

The mobile gateway 108 can also bill a user for each selected service. Since various pricing strategies may be associated with the various services, the mobile gateway 108 can include information on the costs associated with the different available services in each of the tenant's respective subscription policies. Accordingly, the mobile gateway 108 will have access to the services that are enabled for a subscriber tenant 130, and the cost structure associated with the use of the services. For example, certain services may have costs structures associated with the extent of usage of the service, and others may have cost structures associated with the duration of usage, and some cost structures may be a combination of both. Further, the rates that are separately charged each of the subscriber tenants 130 for voice or data services may vary depending on certain circumstances, i.e. due to an increased amount of use. Accordingly, the mobile gateway 108, along with determining costs for services that have been used, can also provide cost estimates for services that may be offered depending on their duration and usage. In one example, the mobile gateway 108 may communicate with a charging gateway function (CGF) 114 and/or a policy charging rules function (PCRF) 116 to receive policy and/or charging information for each respective subscriber tenant 130.

The embodiments described above are illustrative examples, so other embodiments are possible. Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the FIGS. or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof. Any of the devices, features, methods, and/or techniques described may be mixed and matched to create different systems and methodologies.

We claim:

1. A system for providing connectivity service in a multi-tenant network, comprising:
   a first node;
   a second node in communication with the first node over the multi-tenant network;
   the first node configured to receive a plurality of data packets, each of the data packets identifying one of a plurality of tenant devices, wherein each of the plurality of tenant devices is associated with one of a plurality of tenants;
   the first node further configured to determine an Internet Protocol (IP) address associated with each of the data packets;
   the first node further configured to determine a Virtual Local Area Network Identifier (VLAN ID) based on the IP address, the VLAN ID being a unique identifier of a respective one of the tenants;
   the first node further configured to add the VLAN ID of a corresponding one of the tenants into a header of each of the data packets; and
   the first node further configured to transport the data packets to the second node via a multi-tenant network tunnel protocol.

2. The system of claim 1, wherein the first node comprises a router further configured to communicate a signaling data to the second node, wherein the signaling data comprises a policy profile of a respective tenant, the policy profile comprising the IP address and the VLAN ID of the respective tenant.

3. The system of claim 2, wherein the signaling data is communicated to the second node using one or more Protocol Configuration Option (PCO) parameters in the multi-tenant network tunnel protocol.

4. The system of claim 1, wherein the first node is further configured to determine a policy profile associated with a tenant in accordance with a subscription of the tenant based on the IP address, wherein the policy profile comprises the VLAN ID of the tenant.

5. The system of claim 4, wherein the policy profile comprises a security parameter associated with the IP address and the first node further configured to transport the data packets to the second node via a secure tunnel protocol within the multi-tenant network tunnel protocol.

6. The system of claim 1, wherein the first node comprises a router in communication with the tenant devices, the router configured to allocate a different set of IP addresses to each of the plurality of tenants for use with the tenant devices associated with a respective tenant.

7. The system of claim 1, wherein the first node comprises a router in communication with the tenant devices, the router further configured to allocate a different VLAN ID to each of the plurality of tenants for use with all the tenant devices associated with a respective tenant.

8. The system of claim 1, wherein the first node comprises a mobile gateway configured to provide a connection to a service provider network, the mobile gateway further configured to generate a tenant billing data for each of the tenants in accordance with a respective tenant subscription, the tenant billing data being different for each of the tenants.

9. The system of claim 1, wherein the first node comprises a mobile gateway configured to provide a connection to a service provider network, the mobile gateway further configured to generate a tenant usage data for each of the tenants in accordance with a respective tenant subscription, the tenant usage data being different for each of the tenants.

10. A method for forwarding data packets in a multi-tenant network, comprising:
    receiving with a first node a plurality of data packets associated with a plurality of tenant devices, wherein each of the plurality of tenant devices is associated with one of a plurality of tenants;
    determining with the first node an Internet Protocol (IP) address associated with each of the data packets;
    determining with the first node a tenant identifier based on the IP address, the tenant identifier being a unique identifier of a respective one of the tenants;
    adding with the first node the tenant identifier corresponding to one of the tenants into a header of each of the data packets; and
    transporting the data packets between the first node and a second node via a multi-tenant network tunnel protocol.

11. The method of claim 10, wherein the first node comprises a customer premises equipment (CPE) device and the second node comprises a mobile gateway.

12. The method of claim 11, further comprising communicating a signaling data from the CPE device to the mobile gateway, wherein the signaling data comprises a policy profile of one of the tenants that includes a set of IP addresses and a tenant identifier of the tenant.

13. The method of claim 12, wherein the CPE device comprises a router and wherein the mobile gateway comprises a Packet Data Network Gateway (PGW).

14. The method of claim 10, wherein the tenant identifier comprises a Virtual Local Area Network Identifier (VLAN ID), wherein the multi-tenant network tunnel protocol comprises at least one of a GPRS Tunneling Protocol (GTP) or a Mobile Internet Protocol (Mobile IP), and wherein the step of transporting comprises encapsulating the VLAN ID inside the at least one of the GPRS Tunneling Protocol or the Mobile Internet Protocol.

15. The method of claim 10, further comprising determining at the first node a policy profile associated with the one of the tenants in accordance with a subscription of the one of the tenants based on the IP address, wherein the policy profile comprises the tenant identifier of the one of the tenants.

16. The method of claim 10, wherein the tenant identifier comprises a Virtual Local Area Network Identifier (VLAN ID).

17. The method of claim 10, further comprising determining at the first node a policy profile associated with the one of the tenants in accordance with a subscription of the one of the tenants based on the IP address, wherein the policy profile comprises a security parameter of the one of the tenants, and transporting the data packets from the first node to the second node via a secure tunnel protocol within the multi-tenant network tunnel protocol.

18. The method of claim 10, further comprising generating at the second node a usage data for each of the plurality of tenants in accordance with a subscription of a respective tenant.

19. The method of claim 10, further comprising generating at the second node a tenant billing data for each of the plurality of tenants in accordance with a subscription of a respective tenant.

20. A tangible computer-readable media comprising a plurality of instructions for execution with a processor, the tangible computer-readable medium comprising:
    instructions executable to receive data packets from a tenant device associated with one of a plurality of tenants;
    instructions executable to identify a tenant from among the plurality of tenants based on the received data packets;
    instructions executable to insert an identifier uniquely associated with the tenant in a header of the data packets;
    instructions executable to transport the data packets from a customer premises equipment (CPE) device to a mobile gateway via a multi-tenant network tunnel protocol, wherein the data packets include the identifier associated with the tenant;
    instructions executable to determine a policy profile of the tenant based on the identifier; and
    instructions executable to apply policy rules to the data packets based on the policy profile.

* * * * *